(12) United States Patent
Stephan et al.

(10) Patent No.: US 8,137,000 B2
(45) Date of Patent: Mar. 20, 2012

(54) WHEEL BEARING

(75) Inventors: Bernd Stephan, Schweinfurt (DE); Jesko-Henning Tanke, Schweinfurt (DE)

(73) Assignee: AB SKF, Göteborg (SE)

( * ) Notice: Subject to any disclaimer, the term of this patent is extended or adjusted under 35 U.S.C. 154(b) by 1078 days.

(21) Appl. No.: 11/793,768

(22) PCT Filed: Dec. 3, 2005

(86) PCT No.: PCT/EP2005/012961
§ 371 (c)(1),
(2), (4) Date: Feb. 7, 2008

(87) PCT Pub. No.: WO2006/072305
PCT Pub. Date: Jul. 13, 2006

(65) Prior Publication Data
US 2008/0304785 A1    Dec. 11, 2008

(30) Foreign Application Priority Data

Dec. 22, 2004    (DE) .......................... 10 2004 061 774

(51) Int. Cl.
*F16C 13/00*        (2006.01)
*B60B 27/00*        (2006.01)
(52) U.S. Cl. ................................... 384/589; 301/105.1
(58) Field of Classification Search ................ 384/543, 384/544, 569, 586, 589; 301/105.1, 124.1, 301/137
See application file for complete search history.

(56) References Cited

U.S. PATENT DOCUMENTS

| 2,573,735 | A | * | 11/1951 | Sanford et al. | ................ | 295/44 |
| 3,977,741 | A | | 8/1976 | Lundberg | | |
| 6,889,802 | B2 | * | 5/2005 | Hamperl | ................ | 301/105.1 |
| 7,413,261 | B2 | * | 8/2008 | De Freitas | ................ | 301/105.1 |
| 2002/0015545 | A1 | * | 2/2002 | Griseri et al. | ................ | 384/589 |

FOREIGN PATENT DOCUMENTS

| DE | 24 30 609 | | 1/1975 |
| DE | 199 61 710 | C1 | 2/2001 |
| DE | 101 28 072 | A1 | 12/2002 |
| DE | 10 2004 018 90 | A1 | 11/2005 |
| DE | 10 2004 018 900 | A1 | 11/2005 |
| FR | 2.203.717 | A | 5/1974 |
| JP | 63-66619 | U | 5/1988 |

(Continued)

OTHER PUBLICATIONS

Translation of DE102004018900, translation obtained on Mar. 17, 2011.*

(Continued)

*Primary Examiner* — James Pilkington
(74) *Attorney, Agent, or Firm* — Buchanan Ingersoll & Rooney PC

(57) ABSTRACT

A wheel bearing for a driven wheel provided with a roller bearing module includes an outer ring and a hub which can be slide onto the outer ring from at least from one side such that it encompasses a partial area of the outer covering of the outer ring, wherein at least one area of the outer covering of the outer ring and one area of an inner covering of the hub are embodied in the form of a conical covering so that they match each other and can be arranged adjacent to each other.

28 Claims, 6 Drawing Sheets

FOREIGN PATENT DOCUMENTS

| | | |
|---|---|---|
| JP | 3-29721 U | 3/1991 |
| WO | WO 03/070490 A1 | 8/2003 |

OTHER PUBLICATIONS

English language translation of the Written Opinion of the International Searching Authority.

English language translation of Japanese Notification of Reasons for Rejection dated Feb. 15, 2011 issued in the corresponding Japanese Patent Application No. 2007-547234.
PCT/ISA/210.
Official Action issued on Sep. 20, 2001 by the Japanese Patent Office in corresponding Japanese Patent Application No. 2007-547234, and English language translation of the Official Action, 4 pgs.

* cited by examiner

WHEEL BEARING

TECHNICAL FIELD

The invention relates to a wheel bearing of a driven wheel with a roller bearing assembly, comprising an outer ring, and with a hub which can be slipped onto the outer ring at least from one side, surrounding a partial region of the outer jacket of the outer ring.

BACKGROUND DISCUSSION

For example, DE 199 61 710 C1 discloses a wheel bearing arrangement of a driven axle which is made such that a roller bearing assembly and the hub surrounding the roller bearing assembly adjoin one another in the manner of a circular cylindrical jacket and that to change the brake disks at least parts of the roller bearing assembly must be dismounted at the same time.

SUMMARY

The object of the invention is to devise an improved wheel bearing of a driven wheel which is characterized especially also by ease of dismounting.

For example, compared to the initially described wheel bearing of DE 199 61 710 C1, based on the adjoining surface in the shape of the jacket of a truncated cone between the hub and outer ring for the wheel bearing as disclosed herein, dismounting is advantageously clearly simplified.

In one advantageous embodiment a brake disk assembly can be slipped over the outer ring. Compared to the initially described wheel bearing of DE 199 61 710 C1, after dismounting of the hub the brake disk assembly can be easily dismounted without in doing so the roller bearing assembly having to be dismounted at the same time; this protects the roller bearing assembly especially advantageously against damage. This is especially advantageous since during the normal service life of the wheel bearing the brake disk must be changed at least once, conversely the roller bearing assembly lasts the entire service life.

Other advantages and details of the invention will become apparent from the embodiments of the invention described below.

BRIEF DESCRIPTION OF DRAWING FIGURES

DETAILED DESCRIPTION

Figure 1:
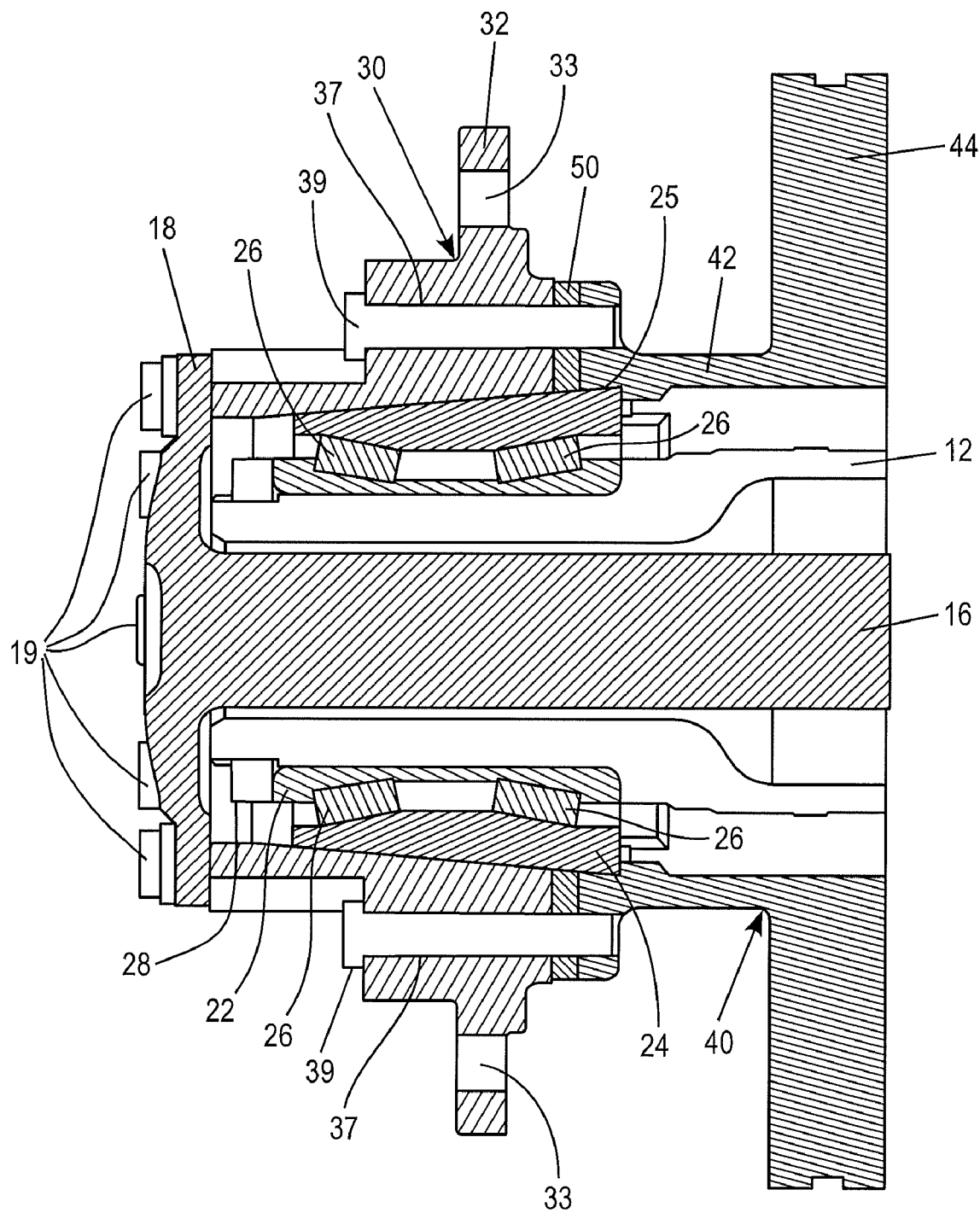
FIG. 1 shows a lengthwise section through a wheel bearing of a driven wheel in a first embodiment of the invention.
Figure 2:
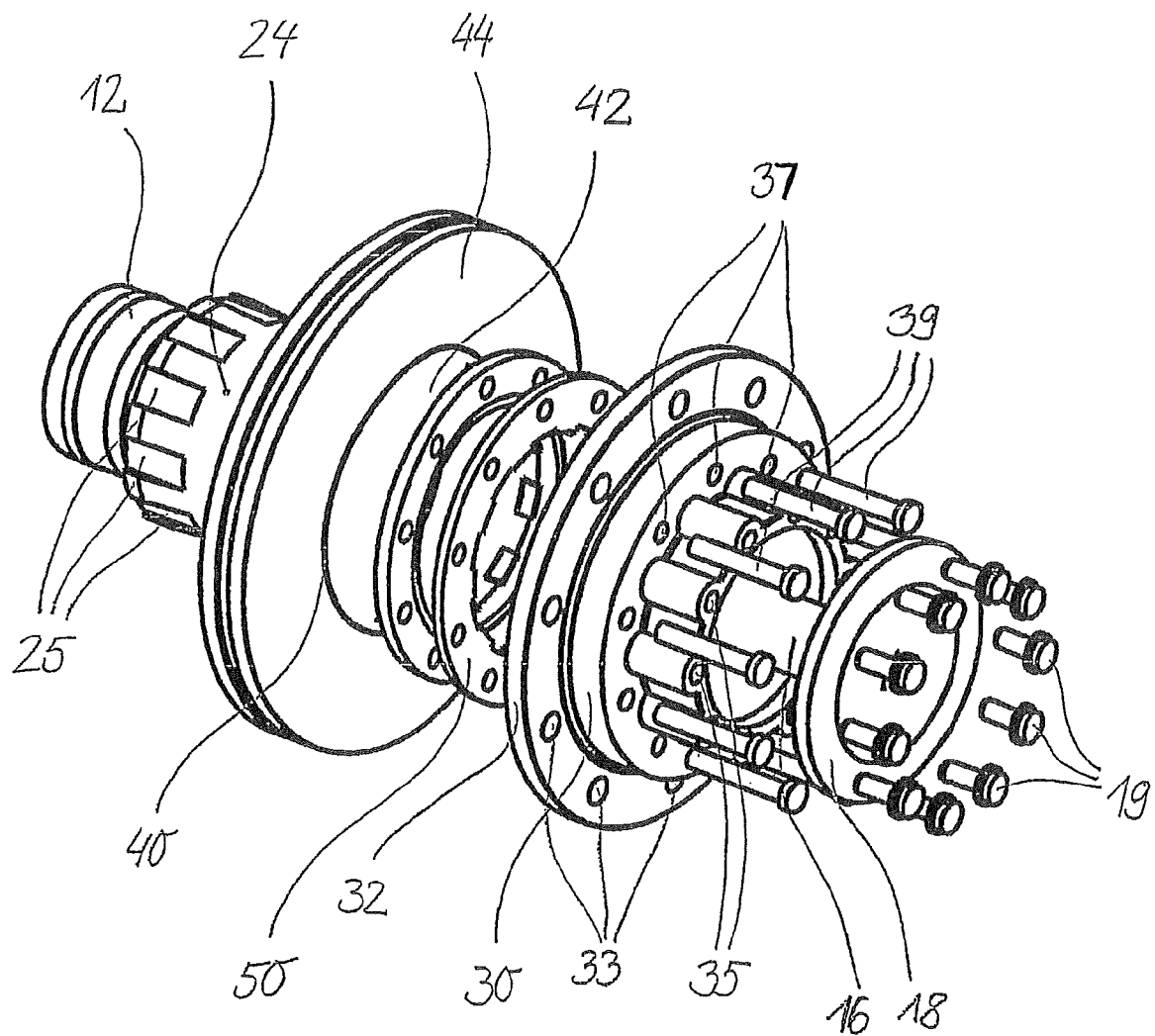
FIG. 2 shows a perspective exploded representation of the wheel bearing of FIG. 1.

FIG. 1 shows a lengthwise section through the wheel bearing of a driven wheel as a first embodiment of the invention. FIG. 2 which goes with it shows a perspective exploded representation of the wheel bearing of FIG. 1. The wheel bearing comprises a sleeve-like axle shaft 12 which properly does not rotate, in which there is a drive shaft 16 which on its front end side comprises a drive shaft flange 18 which has been molded on. The front is that side from which the rim of the wheel is mounted; this corresponds to the left in FIG. 1. Furthermore the outer jacket of the axle shaft 12 is formed to accommodate a two-row tapered roller bearing with the corresponding bearing seat. In this connection the bearing seat is bordered by the thread to the front and by the shoulder of the axle shaft to the rear. On the bearing seat there is an axially split inner ring 22 of a tapered roller bearing, the inner ring 22 being braced against the shoulder of the axle body using a lockable axle nut 28 which can be screwed onto the threaded region of the axle shaft 12.

Furthermore, the two-row tapered roller bearing in an O-arrangement encompasses an outer ring 24, between the inner ring 22 and the outer ring 24 there being truncated cone-like roll bodies 26 which are guided in a cage which is not shown. Here the outer ring 24 is made such that its outer jacket, proceeding from the front region, widens in the manner of the jacket of a truncated cone to the rear. In the rear area the outer jacket of the outer ring 24 is made such that several wedges 25 which are uniformly distributed in the peripheral direction extend on a circular cylinder-like jacket surface, thicken radially from front to back and at least in their front partial region continues the truncated cone jacket-like region of the outer ring 24. Thus, the rear area of the outer jacket of the outer ring 24 has a type of rectangle-shaped toothing when the circumferential line is unwound into a plane.

For mounting and dismounting of the brake disk assembly 40 it can be moved over a large part of the axial length of the outer ring 24.

In this connection the brake disk assembly 40 comprises a hollow-cylinder like brake disk carrier 42 with the actual brake disk 44 located on its rear region. In the front region of the inner jacket the brake disk carrier 42 is made with toothing corresponding to that of the outer ring with teeth which extend to the inside. In this connection the outer ring 24 and the brake disk assembly 40 are made matched to one another such that when the teeth of the brake disk assembly 40 engage the gaps of the toothing of the outer ring 24 the brake disk assembly 40 can be slipped on from the front over the outer ring 24 to the rear, at least as far as the position shown in the figure. After the brake disk assembly 40 has been slipped on, a crown gear 50 and then a hub 30 are slipped onto the outer ring 24 during mounting.

On the inner jacket of the crown gear 50, for engaging the teeth of the outer ring 24 there are the corresponding teeth so that the crown gear 50 is located torsionally strong on the outer ring 24. In this connection the crown gear 50 comprises holes which are arranged uniformly distributed in the peripheral direction. In the front flange-like region the brake disk carrier 42 also comprises the corresponding holes which are made relative to the holes of the crown gear 50 such that congruency between the holes of the crown gear 50 and of the brake disk carrier 42 is only achieved when the brake disk carrier 42 so to speak is turned by roughly one half tooth division with respect to the tooth division of the outer ring 24. Thus the brake disk carrier 42 with respect to tensile loading from the front sits securely on the outer ring 24 such that bracing of the hub 30 on the outer ring 24 is possible, which will be described below.

At least one partial region of the inner jacket of the hub 30 which is to be attached to the outer ring 24 is made with a corresponding truncated cone jacket-like region to fit the truncated cone jacket-like region of the outer ring 24. In this connection the hub 30 can be made to comprise cast iron and/or a lightweight metal. So that the hub 30 can be mounted on the outer ring 24 from the front and also can be dismounted again, the pitches of the truncated cone jacket-like regions are selected to be barely above self-locking.

The hub 30 furthermore has a radially outside, flange-like region 32 with holes 33 to which the rim of the wheel can be attached. Furthermore the hub 30 in the forward region is provided with holes 35 such that the flange 18 of the drive shaft 16 can be screwed to the hub 30 by means of corresponding screws 19.

Furthermore the hub 30 comprises holes 37 which axially penetrate the hub 30, which are arranged distributed in the peripheral direction, and which are made to linearly continue the holes of the crown gear 50 in the axial direction. By means of screws 39 which engage the brake disk assembly 40 through the holes 37 of the hub 30 and the crown gear 50, the hub 30 can be drawn onto the outer ring 24 by tightening the screws 39 and can be held braced accordingly, since as described above the brake disk assembly 40 is drawn against the wedges 25 of the outer ring 24 by the offset by half a tooth. The crown gear 50 prevents the entire arrangement from turning during operation and especially the brake disk assembly 40 from no longer being able to keep the hub 30 braced.

The hub 30 in the forward region of its outer jacket is made such that for the holes 35 there are elevations which are bulged to the outside in the shape of a hemisphere, which extend in the axial direction and which are uniformly distributed in the peripheral direction, then there being holes 37 for the screws 39 so-to-speak on the gaps between the elevations.

Figure 3:
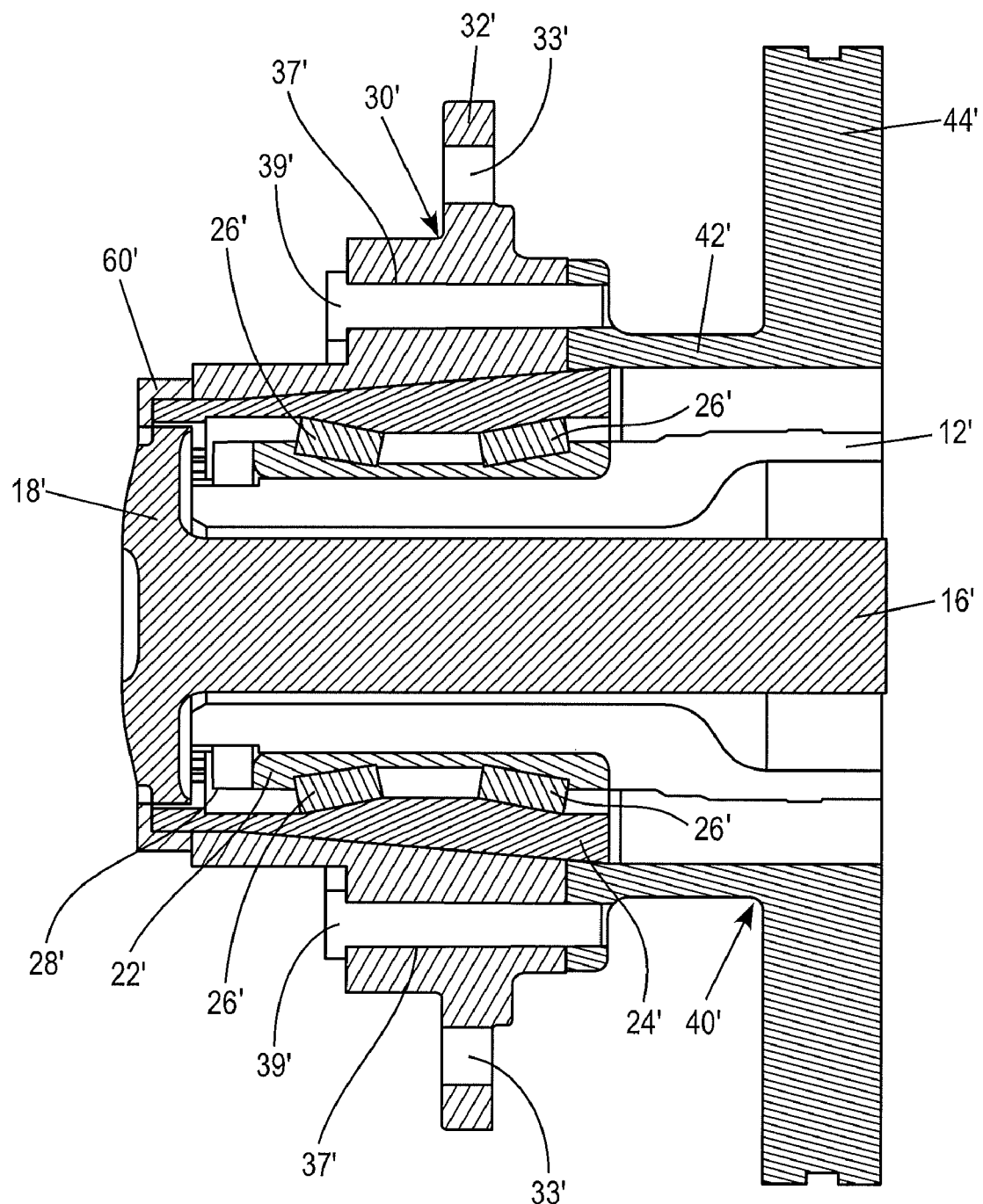
FIG. 3 shows a lengthwise section through a wheel bearing of a driven wheel in a second embodiment of the invention.
Figure 4:
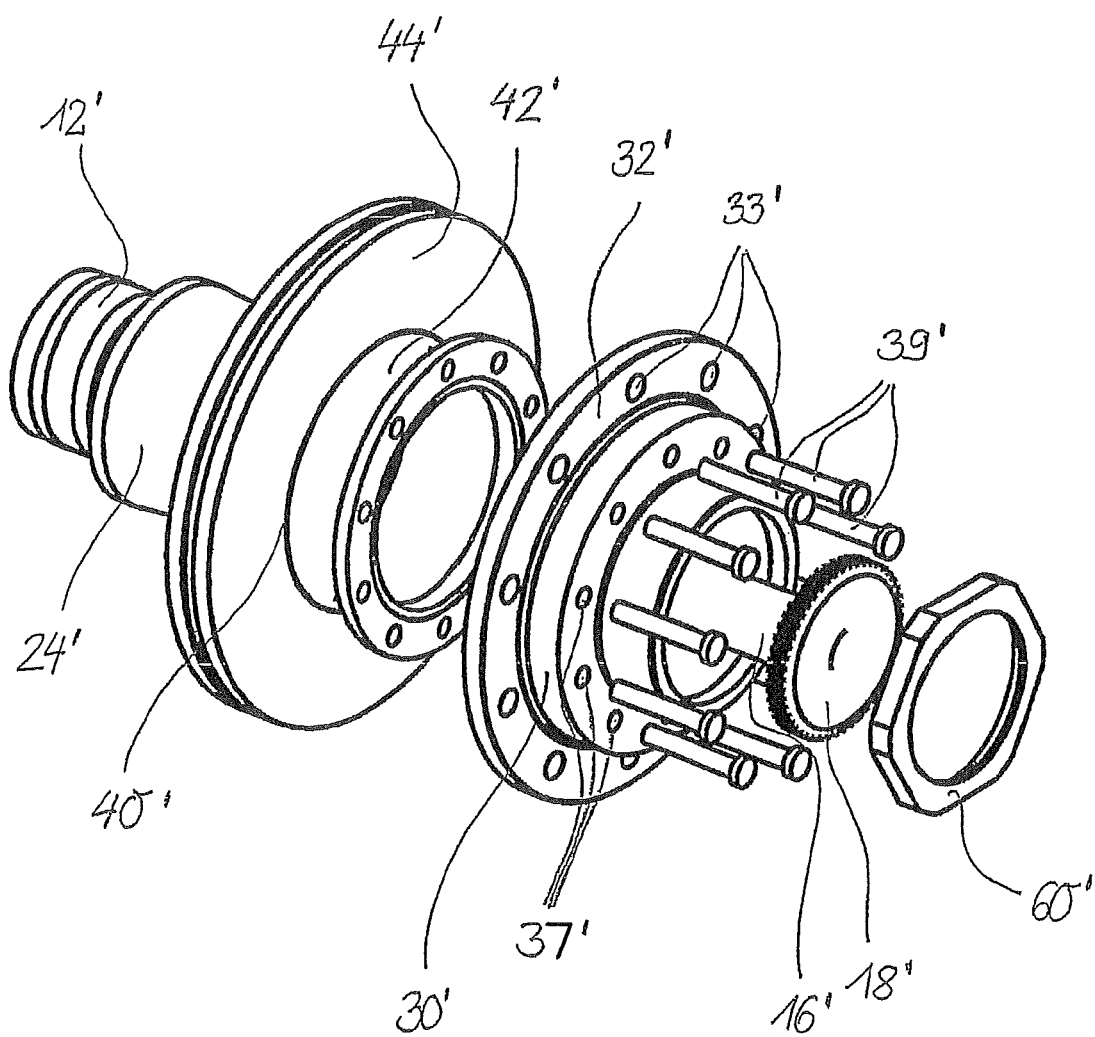
FIG. 4 shows a perspective exploded representation of the wheel bearing of FIG. 3.

FIG. 3 shows as a second embodiment of the invention a lengthwise section through the wheel bearing of a driven wheel. FIG. 4 shows along with it a perspective exploded representation of the wheel bearing of FIG. 3. The wheel bearing comprises a sleeve-like axle shaft 12' which properly does not rotate, in which there is a drive shaft 16' which on its front end side comprises a drive shaft flange 18' which has been molded on. The front is that side from which the rim of the wheel is mounted; this corresponds to the left in FIG. 3. Furthermore the outer jacket of the axle shaft 12' is formed to accommodate a two-row tapered roller bearing with the corresponding bearing seat. In this connection the bearing seat is bordered by a thread to the front and by the shoulder of the axle shaft to the rear. On the bearing seat there is an axially split inner ring 22' of the tapered roller bearing, the inner ring 22' being braced against the shoulder of the axle body using a lockable axle nut 28' which can be screwed onto the threaded region of the axle shaft 12'. Furthermore the two-row tapered roller bearing in an O-arrangement encompasses an outer ring 24', between the inner ring 22' and the outer ring 24' there being truncated cone-like roll bodies 26' which are guided in a cage which is not shown.

The wheel bearing comprises a brake disk assembly 40' which can be moved for mounting and dismounting over a large part of the axial length of the outer ring 24'. In this connection the brake disk assembly 40' can be slipped from forward over the outer ring 24' to the rear, at least to the position shown in the figure. The brake disk assembly 40' comprises a hollow cylinder-like brake disk carrier 42' with the actual brake disk 44' located on its rear region. In the forward flange-like region the brake disk carrier 42' comprises holes which are arranged uniformly distributed in the peripheral direction.

The outer ring 24' is made such that its outer jacket, proceeding from the front region, widens to the rear in the manner of the jacket of a truncated cone. At least one partial region of the inner jacket of the hub 30' which is to be attached to the outer ring 24' is made with a corresponding truncated cone jacket-like region to fit the truncated cone jacket-like region of the outer ring 24'.

In this connection, the hub 30' can be made to comprise cast iron and/or a lightweight metal. So that the hub 30' can be mounted and dismounted on the outer ring 24' from the front, the pitches of the truncated cone jacket-like regions are selected to be barely above self-locking.

The hub 30' has a radially outside, flange-like region 32' with holes 33' to which the rim of the wheel can be attached. Furthermore the hub 30' comprises holes 37' which are arranged distributed in the peripheral direction, which axially penetrate the hub 30 for connecting the brake disk assembly 40' to the hub 30' by means of screws 39', and linearly continue the holes of the brake disk assembly 40' in the axial direction.

The outer ring 24' is made lengthened to the front. In this connection the inside jacket of the outer ring 24' in the frontmost region is made with toothing into which for corresponding transfer of the rotary motion from the drive shaft 16' to the outer ring 24' and thus to the hub 30' the outer jacket of the drive shaft flange 18' is made with the corresponding toothing which engages the toothing of the outer ring 24'. The outer jacket of the outer ring 24' is furthermore made provided with a thread in the frontmost region onto which a nut 60' can be screwed for bracing of the hub 30' on the outer ring 24'. On its front face side the nut 60' is made with a rim with an inside diameter which is dimensioned to be smaller than the maximum outside diameter of the toothed drive shaft flange 18' so that the drive shaft 16' is held in the axle shaft 12' at the same time when the nut 60' is screwed on.

In addition, for wheel bearings of a driven wheel according to this invention the hub can be made such that it has a hollow cylindrical region which extends axially forward and which essentially surrounds a nut which can be screwed for example on the outer jacket of the outer ring in the properly mounted state and in the axial direction projects over it. In this connection, on the inner jacket of this hollow cylindrical region, in that region in which for a properly mounted wheel bearing the front face surface the nut comes to rest, there is a ring-like groove such that a ring, especially a snap ring, can be inserted into the groove, which protrudes radially to the inside over the inside cylinder jacket of the hollow cylindrical region and over the outer cylinder jacket of the nut. In this way the nut is locked and the hub can be easily dismounted from the roller bearing assembly without dismounting the roller bearing assembly by the hub being removed at the same time with the corresponding rotation of the nut via the snap ring. In this connection the nut on the front face side is provided with means which can be engaged by a tool for turning the nut. Furthermore the front face side of the outer ring is likewise made with means which when the nut is turned stop the concomitant turning of the outer ring using a tool which engages the indicated means. In one embodiment the means can comprise recesses which are machined from the face side into the nut or into the outer ring. Especially because the hub is made as a separate component which can be detached from the roller bearing assembly, the hub can be dismounted in a controlled manner, preventing damage to the roller bearing assembly, since the roller bearing unit need not be dismounted at the same time so that the brake disk which is located in the axial direction farther to the rear than the flange of the hub and overlaps with the flange when viewed in the axial direction can be very advantageously replaced. Here it should be watched that during the normal service life of the wheel bearing the brake disk should be replaced at least once and furthermore for a wheel bearing in which the hub and outer ring can only be dismounted as a unit, dismounting of this unit generally leads to the pertinent roller bearing assembly being damaged during dismounting especially in the region of the seals such that cost-intensive complete replacement of the wheel bearing is necessary.

In addition, the wheel bearings of a driven wheel as claimed in this invention can be made with a pulse generator ring, for example for the antilock system. Here the pulse generator ring is made such that proceeding from its proper attachment site forward it is made free of overlaps with the outer ring in the axial direction. The pulse generator ring can be replaced especially advantageously with the hub dismounted from the front without dismounting the roller bearing assembly.

In addition the wheel bearing of the driven wheel as claimed in this invention can be made with the seal of the truncated cone jacket-like regions. In this connection the seal comprises sealing means with which especially penetration of moisture between the two truncated cone jacket-like regions is prevented so that corrosion is prevented there and the hub can also be reliably and easily dismounted after a comparatively long operating life under rough ambient conditions. The sealing means comprise a front and a rear sealing element which is made essentially annular.

In addition, for the wheel bearings of the driven wheel as claimed in this invention, the split inner ring, comprising the front inner ring and the rear inner ring, can be made as follow: On that side on which the two inner rings properly adjoin one another, the two inner rings are made to engage one another in the axial direction. For this purpose each of the inner rings in the end region toward the indicated side is provided with an annular groove which is made to form an undercut in the axial direction in interplay with an annular region which is forward of the groove in the direction to the indicated end. The facing jacket surfaces of the ring-like regions are each provided with a thread which fits one another. Since the threads in the properly installed state no longer touch one another and moreover none of the forces which occur during wheel bearing operation are to be transferred, a comparatively rough execution of the thread is sufficient—a fine thread need not be provided. In the properly installed state the back face surface of the annular region of the front inner ring adjoins the face surface which borders the groove of the rear inner ring to the rear. Moreover force is also transferred. The two threads do not engage one another.

The axial extension of the annular grooves is chosen such that it is larger than the axial extension of the annular regions provided for engagement. With respect to initial mounting on the axle shaft, advantageously the two inner rings can be delivered captively against one another screwed into one another via the thread so that the inner rings screwed into one another are slipped onto the axle shaft until the rear inner ring adjoins properly in order to move afterwards by turning the front inner ring to the rear such that the two inner rings are released from one another on their threads and properly adjoin one another. The interlocking of the two inner rings is furthermore advantageous for dismounting of the inner rings for any reasons, since the rear inner ring is removed at the same time with detachment of the front inner ring.

Figure 5:
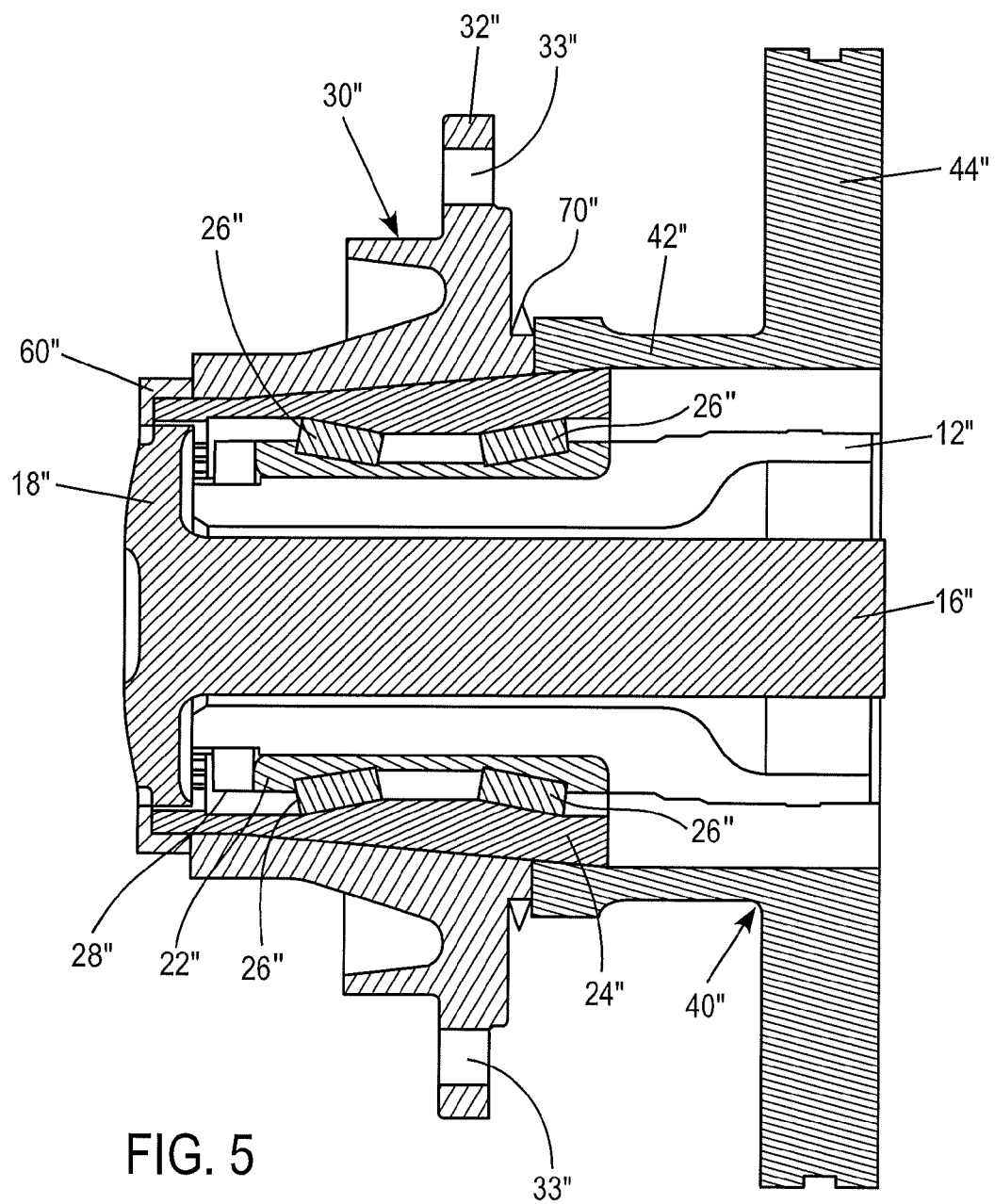
FIG. 5 shows a lengthwise section through the wheel bearing of a driven wheel in a third embodiment of the invention.
Figure 6:
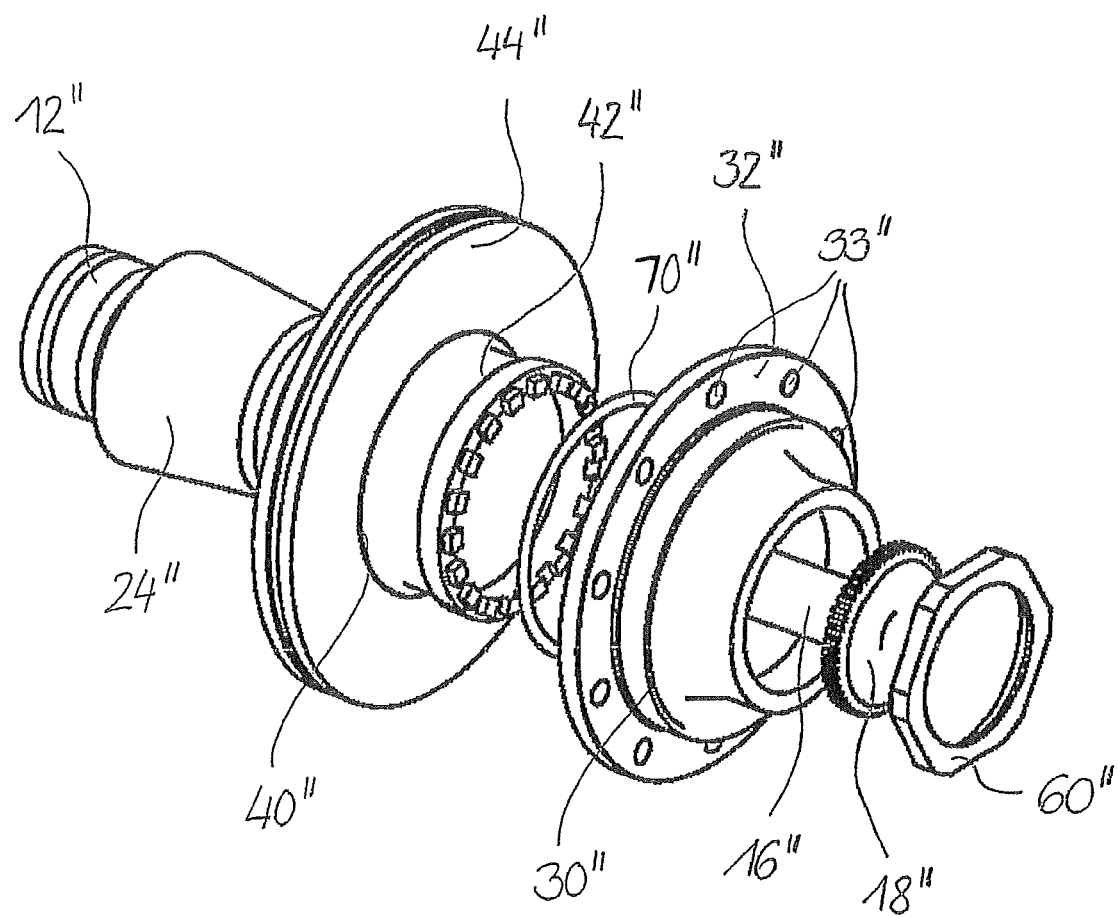
FIG. 6 shows a perspective exploded view of the wheel bearing of FIG. 5.

FIG. 5 shows as a third embodiment of the invention a lengthwise section through the wheel bearing of the driven wheel. FIG. 6 shows along with this a perspective exploded view of the wheel bearing of FIG. 5. Compared to the wheel bearing of FIGS. 3 and 4 the wheel bearing of FIGS. 5 and 6 differs in the execution of the rear region of the outer ring 24" of the tapered roller bearing, the hub 30" and the brake disk assembly 40". Otherwise what was described above for the wheel bearing of FIGS. 3 and 4 applies accordingly. In this connection the components of the wheel bearing of FIGS. 5 and 6 are identified with respect to the corresponding components of the wheel bearing of FIGS. 3 and 4 with the same reference numbers, provided with an additional apostrophe.

For the wheel bearing of FIGS. 5 and 6, the outer jacket of the outer ring 24" is also made in the manner of the jacket of a truncated cone in its rear region in a continuous extension of its middle region. The inside jacket of the brake disk assembly 40", especially of the brake disk carrier 42", is made accordingly in the manner of the jacket of a truncated cone in its front region so that it is accordingly adjacent to the rear region of the outer jacket of the outer ring 24". Compared to the hub 30' of FIGS. 3 and 4 the hub 30" of FIGS. 5 and 6 is made free of holes 37'. For this purpose the hub 30" and the brake disk assembly 40" on their facing end sides are made to engage the toothing with axially projecting teeth so that a braking moment can be transferred via this toothing between the hub 30" and the brake disk 44". Between the indicated end sides of the hub 30" and brake disk assembly 40" there is furthermore a disk spring pair 70" in the region outside the aforementioned toothing so that the connection between the hub 30" and the brake disk assembly 40" is kept under tension and the brake disk 44" is centered.

In another embodiment, especially as an alternative to the toothing of the drive shaft flange 18' and 18" of FIGS. 3 to 6 which engages the outer ring 24' and 24", the drive shaft flange can directly engage the correspondingly made hub by means of toothing, the drive shaft flange being made to be screwed to the outer ring and being pressed against an essentially radially extending surface of the hub for fixed bracing of the hub on the outer ring with screwing down of the drive shaft flange.

The invention claimed is:

1. A wheel bearing of a driven wheel with a roller bearing assembly, the roller bearing assembly including two rows of rolling bodies, and the wheel bearing comprising an outer ring with a hub slipped onto the outer ring at least from one side, the hub surrounding a partial region of an outer surface of the outer ring, and at least one region of the outer surface of the outer ring and one region of an inner surface of the hub having a truncated cone shape, the truncated cone shape extending axially over both rows of rolling bodies, and the one region of the outer surface of the outer ring and the one region of an inner surface of the hub mutually adjoining one another at the truncated cone shape.

2. The wheel bearing as claimed in claim 1, wherein the at least one region of the outer surface of the outer ring and the one region of the inner surface of the hub which mutually adjoin one another at the truncated cone shape are made free of self-locking.

3. The wheel bearing as claimed in claim 1, wherein the outer ring is made free of openings for screwing in screws or guiding them.

4. The wheel bearing as claimed in claim 1, wherein the at least one region of the outer ring is located in a center of the outer ring.

5. The wheel bearing as claimed in claim 1, wherein the roller bearing assembly is located on a hollow axle shaft into which a drive shaft is inserted.

6. The wheel bearing as claimed in claim 5, wherein an end of the drive shaft on the one side from which the hub is slipped onto the outer ring comprises a drive shaft flange.

7. The wheel bearing as claimed in claim 6, wherein drive shaft flange and the hub or the outer ring are made to be able to be screwed to one another.

8. The wheel bearing as claimed in claim 6, wherein an outer surface of the drive shaft flange and an inner surface of the outer ring or the hub engage one another with teeth matched to one another.

9. The wheel bearing as claimed in claim 1, wherein the hub comprises a flange which extends radially outwardly for attaching a rim of the wheel.

10. The wheel bearing as claimed in claim 1, wherein the hub is made of cast iron and/or lightweight metal.

11. The wheel bearing as claimed in claim 1, wherein an outer surface region of the outer ring is formed on one end with a thread that is threadably engaged by a nut for attaching the hub on the outer ring.

12. The wheel bearing as claimed in claim 11, wherein the roller bearing assembly is located on a hollow axle shaft in which is positioned a drive shaft having a radially outwardly extending drive shaft flange, the nut comprising a rim with an inside diameter which is dimensioned to be smaller than a maximum outside diameter of the drive shaft flange.

13. The wheel bearing as claimed in claim 1, wherein an end of the outer surface of the outer ring opposite the one side from which the hub is slipped onto the outer ring includes toothing.

14. The wheel bearing as claimed in claim 13, wherein the toothing has several wedges which are distributed in a peripheral direction and which thicken away from an end of the outer ring coinciding with the one side from which the hub is slipped onto the outer ring.

15. The wheel bearing as claimed in claim 1, wherein a brake disk assembly is slipped over the outer ring from an end of the outer ring coinciding with the one side from which the hub is slipped onto the outer ring.

16. The wheel bearing as claimed in claim 15, wherein the hub and the brake disk assembly are screwed to one another.

17. The wheel bearing as claimed in claim 16, wherein the roller bearing assembly is located on a hollow axle shaft in which is positioned a drive shaft having a radially outwardly extending drive shaft flange, and wherein the drive shaft flange, the hub and the brake disk assembly are screwed to one another with common screws.

18. The wheel bearing as claimed in claim 15, wherein an inside surface of the brake disk assembly on an end of the brake disk assembly opposite the one side from which the hub is slipped onto the outer ring is a surface of a truncated cone that adjoins an end of the truncated cone surface of the outer ring.

19. The wheel bearing as claimed in claim 15, wherein between the hub and the brake disk assembly there is a device elastically pressing the hub and the brake disk assembly axially apart from one another.

20. The wheel bearing as claimed in claim 19, wherein the device comprises a disk spring pair.

21. The wheel bearing as claimed in claim 15, wherein the hub and the brake disk assembly comprise axially projecting teeth on end sides facing one another, the teeth engaging one another.

22. The wheel bearing as claimed in claim 15, wherein an inner surface region of the brake disk assembly on an end coinciding with the one side from which the hub is slipped onto the outer ring is made with toothing that engage the toothing on the outer surface of the outer ring.

23. The wheel bearing as claimed in claim 22, wherein between the brake disk assembly and the hub there is a crown gear with inner surface toothing engaging the toothing on the outer surface of the outer ring, the brake disk assembly comprising a brake disk carrier provided with holes, and the crown gear comprises holes arranged such that the holes in the crown gear and the holes in the brake disk carrier align with one another only when the brake disk assembly is turned by roughly one half tooth division with respect to the tooth division of the outer ring.

24. The wheel bearing as claimed in claim 1, wherein the roller bearing assembly is located on a hollow axle shaft, and wherein the wheel bearing comprises an axle nut with which an inner ring of the roller bearing assembly is attached on the axle shaft.

25. The wheel bearing as claimed in claim 24, wherein the inner ring of the roller bearing assembly is made in at least two parts.

26. The wheel bearing as claimed in claim 24, wherein the wheel bearing comprises means for locking the axle nut against unintentional release.

27. The wheel bearing as claimed in claim 1, wherein the roller bearing assembly is a two-row tapered roller bearing in an O arrangement.

28. A wheel bearing of a driven wheel comprising:
a sleeve-shaped axle shaft adapted to receive a drive shaft, the axle shaft possessing an outer surface at which is provided a bearing seat;
a roller bearing positioned at the bearing seat, the roller bearing comprising two rows of rolling bodies, an outer ring and an inner ring;
the outer ring possessing a truncated-cone shaped outer surface portion whose outer dimension increases, the truncated-cone shape of the truncated-cone shaped outer surface portion extending axially over both rows of rolling bodies;
a hub comprising an outwardly extending flange provided with holes for attachment of a rim of a wheel to the hub from a one side of the hub;
the hub possessing a truncated-cone-shaped inner surface portion adjoining at least a portion of the truncated cone-shaped outer surface portion of the outer ring, the truncated cone-shaped inner surface portion of the hub increasing in dimension in a direction away from the one side of the hub.

* * * * *